Feb. 2, 1954
W. A. HELSTEN
2,667,946
ROTOR BRAKE
Filed Aug. 25, 1949
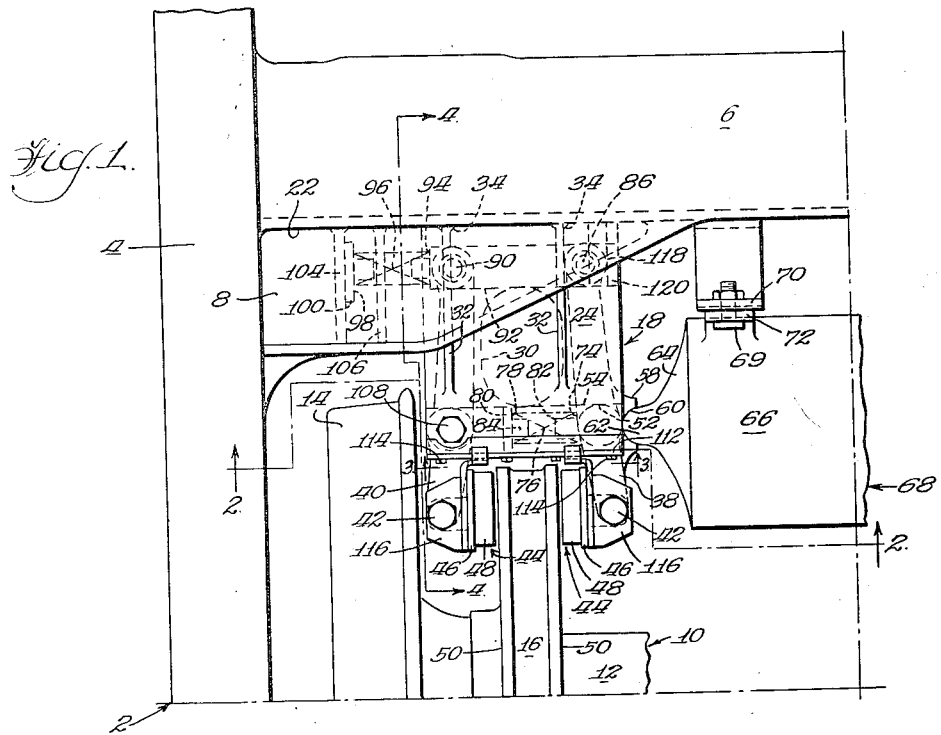
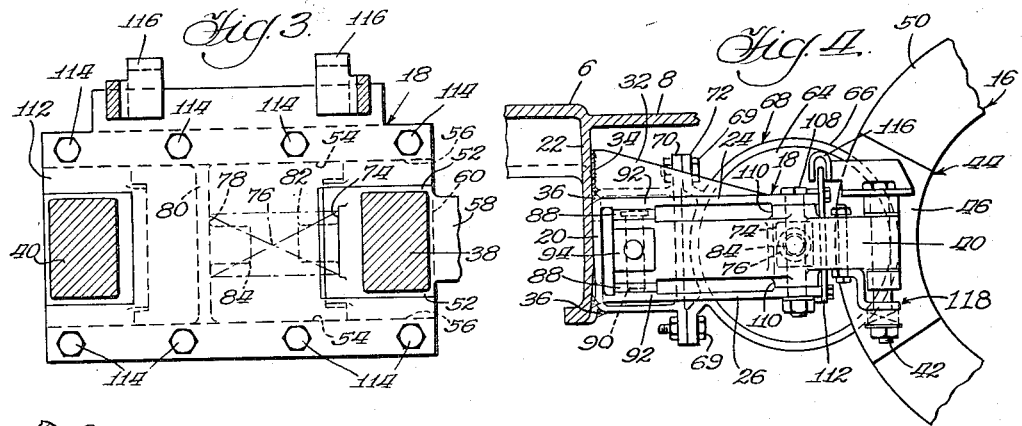
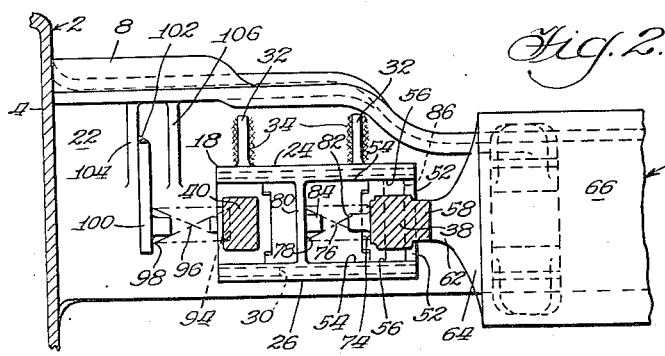
INVENTOR.
Wesley A. Helsten
BY
Atty.

Patented Feb. 2, 1954

2,667,946

UNITED STATES PATENT OFFICE 2,667,946

ROTOR BRAKE

Wesley A. Helsten, Chicago, Ill., assignor to American Steel Foundries, Chicago, Ill., a corporation of New Jersey Application August 25, 1949, Serial No. 112,394

14 Claims. (Cl. 188—59)

This invention relates to brakes and more particularly to off-wheel or rotor brakes wherein disks are supported to rotate with a wheel and axle assembly, each disk being engaged by stators disposed at opposite sides thereof for decelerating the assembly.

The general object of the invention is to provide a novel, compact and efficient operating mechanism for applying and releasing the stators with respect to the disk.

A more specific object of the invention is to provide a system of interconnected levers operated by a single source of power and carrying friction means at opposite sides of each disk for braking cooperation therewith.

The invention contemplates the provision of brake rigging for operating the stators at opposite sides of a brake disk, comprising interconnected live and dead levers disposed at opposite sides of the disk and connected to respective stators, the linkage being actuated by a single piston connected to the live lever.

Another object is to devise a novel, simple support for the brake rigging.

A further object is to provide a brake system wherein a plurality of disks are mounted on a wheel and axle assembly and wherein the brakes associated with respective disks are actuated by a common power device.

These and other objects of the invention will become more apparent from the specification and the drawings, wherein:

Figure 1 is a fragmentary top plan view of one corner of a railway car truck incorporating the invention. It will be understood that the arrangement is the same at opposite sides and opposite ends of the truck.

Figure 2 is a sectional view taken on the line 2—2 of Figure 1;

Figure 3 is a sectional view on the line 3—3 of Figure 1; and

Figure 4 is a sectional view on line 4—4 of Figure 1.

In each of said figures certain details may be omitted where they are more clearly shown in other views.

Referring to the drawings in detail, the truck structure generally designated 2 is of conventional type and comprises a side rail 4 at each side thereof, the side rails being interconnected at each side of the transverse center line of the truck by a transom 6 affording support for a bolster member (not shown) upon which may be mounted a car body, as will be clearly understood by those skilled in the art. The juncture between each side rail 4 and transom 6 is reinforced by an integral generally horizontal gusset 8 extending therebetween.

Each end of the truck structure is supported by a wheel and axle assembly 10 including an axle 12 with a wheel 14 adjacent each end thereof. Each wheel and axle assembly carries a brake disk or rotor 16 adjacent each end thereof preferably connected to the inboard side of each wheel in conventional manner.

A brake support 18 is mounted on the truck structure adjacent each disk and comprises a rear wall 20 seated against an outer vertical wall 22 of the adjacent transom 6. The support 18 also includes spaced substantially horizontal top and bottom walls 24 and 26 connected to the top and bottom edges of wall 20 and extending between the transom 6 and the associated disk 16. The bottom wall is formed with a central opening 30 to lighten the structure and the top wall is provided with upstanding gussets 32, 32 connected to wall 22 preferably as by welding at 34, 34. The top and bottom walls 24 and 26 and rear wall 20 of the support may also be connected to wall 22 of the transom as by welding at 36, 36.

The support carries a pair of substantially horizontal oppositely arranged live and dead truck levers 38 and 40 at opposite sides thereof extending at the inboard and outboard sides of disk 16, respectively. Each lever 38 and 40 is pivotally connected at its outer end by means of a bolt 42 to a stator or brake head assembly generally designated 44, said assembly comprising a brake head 46 to which is attached a shoe 48 adapted for braking engagement with a radial braking face 50 on the adjacent side of the rotor 16.

The lever 38 is formed intermediate its ends on the top and bottom sides thereof with bosses 52, 52 in guided engagement with top and bottom bosses 54, 54 on the inner sides of the top and bottom walls along substantially horizontal surfaces 56, 56, said bosses 54 being disposed adjacent the outer ends of the top and bottom walls of the support. The outer side of the lever 38 is formed with a boss 58 adjacent bosses 52, 52, said boss 58 being provided with a socket 60 adapted to receive a nose 62 formed centrally on a piston 64 extending from one end of a cylinder 66 of the power device generally indicated 68. The cylinder 66 extends transversely of the truck and is secured to the side wall 22 of the transom 6 by bolts 69 extending through brackets 70 and 72 on the side wall 22 of the transom and the cylinder, respectively. The inner side of lever 38 adjacent bosses 52 and 58 is formed with a spring seat 74 for one end of a compressed release spring 76 disposed between the top and bottom walls of the support and extending transversely of lever 38 in alignment with nose 62. The opposite end of the spring 76 seats against a substantially vertical spring seat 78 on a generally vertical tie web 80 extending between the top and bottom walls of the support and formed integral therewith. The spring is positioned at one end on the seat 74 by a spring-positioning lug 82 formed centrally on the seat 74 and at its other end by a lug 84 on the spring seat 78. The spring is effective to constantly urge the lever 38 in a horizontal direction against the nose 62 of the piston 64 to maintain the same in constant engagement and to disengage the brake head assembly 44 on the lever 38 from the brake rotor when the power device is inactivated.

The lever 38 extends longitudinally of the support to a point adjacent the vertical wall 20 thereof and is pivotally connected by a pin at its inner end as at 86 to one of the ends of spaced top and bottom compression bars or links 88, 88, said links or floating linkage seating against the top and bottom sides of said lever 38 and extending substantially parallel to wall 20 in spaced relation thereto longitudinally of the support. The other ends of the links 88 receive the inner end of the dead lever 40 therebetween and are connected thereto by a substantially vertical pin 90 extending therethrough. It will be noted that the links are slidably guided and that the pins are maintained in assembled relationship with the levers and the links by top and bottom bosses 92, 92 formed on the inner sides of the top and bottom walls of the support.

The outer side of the inner end of lever 40 is formed with a spring seat 94 affording a seat for one end of a substantially horizontal spring 96 extending transversely of lever 40, said spring being seated at its opposite end against a substantially vertical spring seat 98 formed on an abutment member 100 connected preferably as by welding at 102 to a substantially vertical gusset 104 extending between the transom wall 22 and the underside of gusset 8 and formed integral therewith. The gusset 8 may be additionally reinforced by a vertical gusset 106 connected thereto and to transom wall 20. The lever 40 extends longitudinally of the support and is pivoted intermediate its ends adjacent the outer ends of the top and bottom walls of the support by a bolt 108 extending through said lever 40 and said top and bottom walls. The lever 40 may be provided with top and bottom bosses 110 which may have guided engagement with the bosses 54, 54 on the top and bottom walls of the support. The outer ends of the top and bottom walls of the support may be connected to a substantially vertical plate 112 as by bolts 114. The plate may project above the top wall for guiding engagement with guide members 116, 116 secured to respective brake heads of the stators by the bolts 42, 42, said guide members being adapted to guide the stators with respect to the friction faces 50, 50 on the related disk 16, as described in a copending United States patent application filed in the name of Carl E. Tack, Serial Number 104,453, for Brake Rotor on July 13, 1949. Rotation of the heads may be controlled by balancing means generally indicated 118 (Figure 4) and more particularly described in United States Patent Number 2,380,803 for Brake Head Balancing Means issued on July 31, 1945, to Carl E. Tack.

It will be understood that the truck is substantially identical at opposite sides thereof and that the actuating or power device 68 and the brake systems are substantially the same at opposite sides of the longitudinal center line of the truck and that each power device 68 actuates two brake systems at opposite sides of the truck.

In operation, actuation of the power device 68 urges each piston 64 outwardly of the cylinder 66 horizontally toward the associated live lever 38. As seen in Figure 1, the lever 38 is caused to move to the left (toward the disk 16), thereby compressing the spring 76 and applying the shoe 48 of the brake head assembly 44 carried thereby against the associated friction face 50 of the rotor 16. The lever 38 is then caused to rotate about the pin 42 in a counterclockwise direction and to move the links 88 to the left, which in turn rotate the lever 40 in a counterclockwise direction, thereby compressing the spring 96 and applying the shoe 48 of the brake head assembly 44 carried thereby against the associated face 50 of the rotor 16. It will be understood that the application of force against the brake heads is substantially equalized by the links and that the shoes are applied substantially simultaneously against opposite sides of the brake disk. To release the brakes the power device is inactivated by exhausting the pressure from cylinder 66, whereupon each piston 64 is moved into the cylinder by the associated lever 38 through the action of the spring 76 which causes the lever 38 to move to the right (Figure 1), thereby disengaging the shoe of the brake head assembly 44 on lever 38 from the rotor. Movement of the lever 38 to the right is accompanied by movement of the links 88 to the right which is accelerated by the expansion of spring 96, and the lever 40 is caused to rotate in a clockwise direction, thereby disengaging the shoe of the stator assembly carried by lever 40 from the related friction face 50 of the rotor. Movement of levers 38 and 40 in release is limited and rattling is eliminated by abutment of the outer side of the inner end of lever 38 as at 118 with a vertical wall 120 (Figure 1) disposed at the inboard side of the brake support frame and connected to the top and bottom walls 24 and 26 of said support. It will be understood that the arrangement not only utilizes a novel operating mechanism for the brake head assemblies but also that the operating mechanism at each side of the truck is operated by a common power device which is positioned therebetween. The space limitations inherent in prior arrangements restricting the size of the power device are avoided and the arrangement utilizes a single piston to actuate the whole brake mechanism associated with each disk affording a simple and effective brake. Although levers 38 and 40 are shown horizontal, they may be positioned at any angle.

I claim:

1. In a brake arrangement for a railway car truck comprising a frame and a supporting wheel and axle assembly, a brake disk carried by said assembly, substantially horizontal live and dead levers disposed at opposite sides of said disk, friction means carried by said levers at one of their ends for engagement with said disk, means pivotally interconnecting said levers at their other ends, a support structure mounted on said frame and comprising spaced, substantially horizontal, top and bottom walls receiving said levers therebetween, means on said walls and said live lever slidably supporting said live lever for movement transversely of said disk, pivot means connecting said dead lever intermediate its ends with said top and bottom walls of said support on an axis accommodating rotation of said dead lever transversely of said disk, power means mounted on said frame and including a piston acting transversely of said disk and operatively connected to said live lever intermediate its ends for moving said lever toward said disk and thereby rotating said dead lever through said connecting means in a direction applying the friction means carried by said dead lever against said disk, and resilient means operatively associated with each lever for moving the same in a direction releasing the friction means carried thereby from said disk.

2. In a brake arrangement for a railway car truck comprising a frame with a transom and a wheel and axle assembly at one side of said transom, power means comprising a substantially horizontal cylinder mounted on said transom and extending at opposite sides of the longitudinal center line of the truck, a piston in each end of said cylinder, a support structure mounted on said transom adjacent each end thereof, a brake rotor carried by said wheel and axle assembly adjacent each support structure, a live lever disposed at each end of said power means between said rotors and slidably supported on the adjacent support for movement in a substantially horizontal plane toward and away from the adjacent rotor, each live lever having an operative connection intermediate its ends with the adjacent piston, dead levers disposed outboardly of said rotors and pivoted intermediate their ends to the respective support structures, friction means carried by said levers at one of the ends thereof for braking cooperation with respective rotors, and means operatively interconnecting adjacent live and dead levers at the other ends thereof.

3. In a rotor brake for a railway car truck, a support structure, a wheel and axle assembly carrying a brake disk, a substantially horizontal live lever at the inboard side of the disk slidably supported on said structure, a substantially horizontal dead lever at the opposite side of the disk pivoted intermediate its ends to said support, friction means carried by said levers at one end for braking cooperation with said disks, links pivotally connecting the other ends of said levers, power means disposed inboardly of said disk and comprising a cylinder with a horizontally acting piston having a nose extending into a socket in said live lever intermediate the ends thereof, release means comprising a horizontal spring acting in opposition to said piston compressed between said support and said live lever intermediate the ends thereof, another release spring acting substantially in parallel with said first-mentioned spring and compressed between said support and said dead lever adjacent said last-mentioned end thereof, and stop means inboardly of said live lever adjacent said last-mentioned end thereof adapted for abutment with said live lever to limit release movement of said levers.

4. In a brake arrangement for a railway car truck comprising a frame and a supporting wheel and axle assembly, a brake disk rotatable with said assembly, live and dead operatively interconnected truck levers disposed at opposite sides of said disk, a brake frame slidably supporting said live lever, pivot means interconnecting said dead lever intermediate the ends thereof with said brake frame, friction means carried by said levers for engagement with said disk, actuating means for said levers operatively connected to said live lever intermediate the ends thereof, and release means for releasing said friction means from said disk comprising spring means compressed between said support and said live lever and acting in opposition to said actuating means.

5. In a brake arrangement for a railway car truck comprising a frame with a transverse member and a wheel and axle assembly disposed at one side of said member, said wheel and axle assembly including an axle and a wheel adjacent each end of said axle, a brake disk adjacent each wheel rotatable with said assembly, live and dead levers disposed at opposite sides of each disk, power means carried by said member intermediate the ends thereof, a stator carried by each lever at one end for engagement with the adjacent side of the associated disk, means operatively connecting the opposite ends of adjacent levers, said power device comprising a cylinder with a piston at each end thereof, and an operative connection between each piston and the adjacent live truck lever.

6. In a brake arrangement for a railway car truck comprising a frame and a supporting wheel and axle assembly, a brake disk carried by said assembly, a support connected to the frame, a live lever slidably supported by said support at one side of said disk, a dead lever at the opposite side of the disk connected intermediate its ends to said support, stators at opposite sides of said disk for engagement therewith and connected to adjacent ends of respective levers, a compression member interconnecting the opposite ends of said levers, and a power cylinder carried by said frame for actuating said levers and including a piston having a nose extending into a pocket in said live lever intermediate the ends thereof.

7. In a brake arrangement, a support, live and dead levers interconnected at one end, actuating means for said levers operatively associated with said live lever, spaced abutment means at said one end of said levers receiving the same therebetween, resilient means acting in opposition to said actuating means and reacting between said one end of the dead lever and the adjacent abutment means for shifting said levers when in released condition to a position engaging said one end of the live lever with the abutment means thereadjacent.

8. In a brake arrangement for a rotatable assembly having a pair of friction surfaces extending generally perpendicular to the axis of rotation of said assembly, a live lever disposed adjacent one surface, a dead lever disposed adjacent the other surface, a support structure slidably supporting said live lever, means pivotally connecting said dead lever intermediate the ends thereof with said structure, a link interconnecting said levers at one end, friction means connected to the other ends of said levers for cooperation with respective surfaces, and actuating means for said levers connected to said live lever intermediate the ends thereof.

9. In a brake arrangement for a rotatable assembly including a brake rotor, oppositely arranged, substantially horizontal, operatively interconnected live and dead levers positioned at opposite sides of said rotor, stators carried by each lever for engagement with said rotor, and power means for actuating said levers to apply said stators against said rotor and comprising a piston operating horizontally transversely of said levers against said live lever intermediate its connections with the dead lever and associated stator.

10. In a brake arrangement for a rotatable assembly including a brake disk, stators at opposite sides of said disk for braking cooperation therewith, and operating means for said stators including a live lever at one side of said disk and a dead lever at the opposite side of said disk, means pivotally connecting each stator to one end of the adjacent lever, power transmitting means interconnecting the other ends of said levers, and actuating means operatively connected to said live lever intermediate the ends thereof.

11. In a brake arrangement, a support structure, a rotatable assembly, and brake means associated with said assembly for braking cooperation therewith and comprising a live lever supported on said structure for movement toward and away from said assembly, friction means pivotally connected at one point to said lever for engaging one side of said assembly, a second friction means adapted for engagement with the opposite side of said assembly and operatively connected to said live lever at another point, and a power device for said brake means acting on said live lever intermediate said points.

12. A brake support structure comprising a substantially vertical wall at one end and spaced substantially horizontal top and bottom walls integral with said first-mentioned wall and extending transversely thereof, a spring seat wall between said top and bottom walls integral therewith and spaced longitudinally of said structure from said first-mentioned wall, and lever guide means on adjacent sides of said top and bottom walls adjacent each extremity thereof.

13. In a brake arrangement, brake rigging including live and dead levers pivotally interconnected at certain of their ends, support means for said levers, release means for said levers comprising spring means interposed and reacting between said support means and said dead lever, said spring means being operative to move said dead lever to release position thereof and to urge said live lever to engage said support means, said spring means being operative to restrain free movement of the rigging.

14. In a brake arrangement, a rotatable assembly, live and dead levers at opposite sides of said assembly interconnected at one of their ends and carrying brake means for engagement with said assembly, abutment means one of which is located between said levers and the other of which is located outwardly of said dead lever, power means connected at one point to said live lever, resilient release means acting between said first-mentioned abutment means and said live lever in opposition to said power means, further release means acting between said second-mentioned abutment means and said dead lever in opposition to said power means, and stop means outwardly of said live lever for abutment with said live lever for limiting movement of said levers by said further release means.

WESLEY A. HELSTEN.

References Cited in the file of this patent

UNITED STATES PATENTS

| Number | Name | Date |
| --- | --- | --- |
| 1,699,659 | Fagan | Jan. 22, 1929 |
| 2,174,398 | Farmer | Sept. 26, 1939 |
| 2,211,883 | Farmer | Aug. 20, 1940 |
| 2,348,078 | Ledwinka | May 2, 1944 |
| 2,385,309 | Spencer | Sept. 18, 1945 |
| 2,423,694 | Eksergian | July 8, 1947 |
| 2,447,244 | Gaenssle | Aug. 17, 1948 |

FOREIGN PATENTS

| Number | Country | Date |
| --- | --- | --- |
| 569,374 | Great Britain | May 22, 1945 |